(12) United States Patent
Stevens et al.

(10) Patent No.: US 9,904,614 B2
(45) Date of Patent: Feb. 27, 2018

(54) SOURCE CODE INSPECTION AND VERIFICATION

(71) Applicant: NodeSource, Inc., Anaheim, CA (US)

(72) Inventors: Ryan Stevens, San Francisco, CA (US); Bradley Meck, Austin, TX (US); Elijah Insua, Brooklyn, NY (US); Paul Devay, Austin, TX (US); Daniel Shaw, San Francisco, CA (US); Tim Oxley, Singapore (SG); Hugh Kennedy, Chatswood (AU)

(73) Assignee: NodeSource, Inc., Anaheim, CA (US)

( * ) Notice: Subject to any disclaimer, the term of this patent is extended or adjusted under 35 U.S.C. 154(b) by 0 days.

(21) Appl. No.: 14/678,574

(22) Filed: Apr. 3, 2015

(65) Prior Publication Data

US 2016/0292066 A1 Oct. 6, 2016

(51) Int. Cl.
*G06F 9/44* (2006.01)
*G06F 11/36* (2006.01)
*G06F 9/445* (2018.01)

(52) U.S. Cl.
CPC ...... *G06F 11/3624* (2013.01); *G06F 11/3604* (2013.01); *G06F 11/3608* (2013.01); *G06F 8/10* (2013.01); *G06F 8/75* (2013.01); *G06F 9/44589* (2013.01); *G06F 11/366* (2013.01)

(58) Field of Classification Search
CPC ............. G06F 11/3604; G06F 11/3624; G06F 11/366; G06F 9/44589; G06F 8/10; G06F 8/75

See application file for complete search history.

(56) References Cited

U.S. PATENT DOCUMENTS

| | | | | |
|---|---|---|---|---|
| 8,312,440 | B2* | 11/2012 | Iwama | G06F 11/3604 717/120 |
| 8,589,889 | B2* | 11/2013 | Kim | G06F 11/3648 714/2 |
| 9,436,463 | B2* | 9/2016 | Sass | G06F 8/751 |
| 2010/0050155 | A1* | 2/2010 | Iwama | G06F 11/3604 717/120 |

(Continued)

OTHER PUBLICATIONS

B. Bauer et al., The ALPS project release 2.0: Open source software for strongly correlated systems, May 23, 2011, retrieved online on Oct. 10, 2017, pp. 1-35. Retrieved from the Internet: <URL:https://arxiv.org/pdf/1101.2646>%20and%20underlying&20workflows%20at%20<http://arxiv.org/abs/1101.2646>.*

(Continued)

*Primary Examiner* — Hanh T Bui (57) ABSTRACT

A source code module inspection method comprising generating a build list, wherein the build list comprises a list of one or more source code modules, obtaining, from a remote server, the one or more source code modules and metadata associated with the one or more source code modules, accessing at least a portion of the metadata for each of the one or more source code modules, identifying licenses associated with the one or more source code modules based on the build list, and generating a source code module summary for the one or more source code modules, wherein the source code module summary identifies the one or more source code modules, licenses associated with the one or more source code modules, and comprises the portion of the metadata for each of the one or more source code modules.

19 Claims, 7 Drawing Sheets

(56) References Cited

U.S. PATENT DOCUMENTS

| | | | | |
|---|---|---|---|---|
| 2011/0055807 A1* | 3/2011 | Mahajan | ............... | G06F 8/61 |
| | | | | 717/107 |
| 2012/0246616 A1* | 9/2012 | Frontiero | ............... | G06F 8/71 |
| | | | | 717/121 |
| 2013/0067426 A1* | 3/2013 | Fox | ............... | G06F 8/71 |
| | | | | 717/101 |
| 2013/0326479 A1* | 12/2013 | Russell | ............... | G06F 8/70 |
| | | | | 717/121 |
| 2016/0202978 A1* | 7/2016 | Bradbury | ............ | G06F 9/30036 |
| | | | | 712/220 |

OTHER PUBLICATIONS

Paige Rodeghero et al., Improving Automated Source Code Summarization via an Eye-Tracking Study of Programmers, ACM, 2014, retrieved online on Oct. 10, 2017, pp. 390-401. Retrieved from the Internet<URL: http://delivery.acm.org/10.1145/2570000/2568247/p390-rodeghero.pdf?>.*

* cited by examiner

SOURCE CODE INSPECTION AND VERIFICATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Open source code is a class of code segments or blocks that are made publicly available and that are often designed to perform specific actions. Such code can be easily integrated with other modules or forked to customize code for other specific purposes. This makes open source code an easy building block for developers of larger software projects. Large companies have many complex requirements around the bundling process for open source code. For example, a number of restrictive license provisions may be applicable when open source code is used as part of a larger product. Some licenses require relatively few obligations while others require obligations that may make commercialization of software difficult. Knowing the types of terms and conditions that are applicable to the code used in a project is key to protecting any software project. A build artifact is a unit of work that produces a package that contains source code to be deployed. Some build artifacts (e.g., node.js artifacts) may need to be stored for long periods of time for compliance reasons. It is desirable to allow developers to inspect, compare, rollback, and manage large numbers of build artifacts for deployment.

SUMMARY

In one embodiment, the disclosure includes a source code module inspection method comprising generating a build list, wherein the build list comprises a list of one or more source code modules, obtaining, from a remote server, the one or more source code modules and metadata associated with the one or more source code modules, accessing at least a portion of the metadata for each of the one or more source code modules, identifying licenses associated with the one or more source code modules based on the build list, and generating a source code module summary for the one or more source code modules, wherein the source code module summary identifies the one or more source code modules, licenses associated with the one or more source code modules, and comprises the portion of the metadata for each of the one or more source code modules.

In another embodiment, the disclosure includes a source code verification method comprising obtaining a build list, wherein the build list comprises a list of one or more source code modules, identifying the one or more source code modules in an open source module repository and metadata associated with the one or more source code modules, accessing at least a portion of the metadata for each of the one or more source code modules, obtaining one or more rules for the one or more source code modules, and applying the rules to each of the one or more source code modules to determine whether the one or more source code modules satisfy the rules.

In yet another embodiment, the disclosure includes a source code building method comprising generating a build list, wherein the build list comprises a list of one or more source code modules, obtaining the one or more source code modules repository and metadata associated with the one or more source code modules from an open source module repository, compiling the one or more source code modules repository and metadata associated with the one or more source code modules to create a build artifact, analyzing at least a portion of the metadata for each of the one or more source code modules, obtaining one or more rules for the one or more source code modules, wherein one of the one or more rules is a version check rule for the one or more source code modules, applying the rules to the one or more source code modules to determine whether the one or more source code modules satisfy the rules, generating a deployable build artifact in response to the one or more source code modules satisfying the rules, and generating a compliance report for the deployable build artifact, wherein the compliance report identifies the one or more source code modules in the deployable build artifact.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for creating computer code and allowing for the tracking of the development of the code. Various embodiments for inspecting build artifacts, verifying the compliance of build artifacts, and building code for deployable build artifacts using inspected and verified build artifacts in an open source code context are presented. Build artifacts comprise a bundle that comprises one or more source code modules and optionally metadata associated with the source code modules. Metadata for the source code modules includes, but is not limited to, viewable source code, commit history and authors, contributors, comments, tags, license information, license types, and dependency information. For example, metadata may comprise a plurality of metadata fields and metadata information may be represented as metadata tags in the metadata fields. It is noted that term "source code module" may be used to include the term "open source module" throughout this disclosure. Inspecting build artifacts allows developers to identify source code modules and metadata for the source code modules within a build. Verifying the compliance of build artifacts allows developers to inspect build artifacts (e.g., inspect licenses and dependencies) and to apply one or more compliance tests to source code modules and/or metadata for the source code modules within the build artifact. Building code for deployment using inspected and verified build artifacts provides a framework for preparing and managing build artifacts for deployment.

Developing large software projects is complex and often requires projects to be partitioned into multiple units or modules (e.g., build artifacts). Dividing a project into smaller units allows multiple developers to work simultaneously on the same project. Developers can work on different modules or can work on the same modules. Some developers may be located proximate to one another, while others may be located in different geographical locations. However, each developer is able access the project's resources to contribute to the project. For example, developers may share common source code module repositories to develop and share source code modules for the project. A common work environment or platform is used to allow developers to access and share resources. The common work platform serves as an enterprise service system that allows developers to interact with each other and shared resources remotely from their respective computers or devices.

As an example, multiple developers may be working on a build artifact for a project. Each developer may work on and revise the build artifact as the project progresses from their respective locations and devices. Developers may modify, add, and/or remove source code modules and/or metadata for the source code modules for the build artifact. These changes to the build artifact can result in changes to licenses and dependencies for the build artifact. As the build artifact evolves with the project, changes to the build artifact are tracked and monitored. For example, version changes, license changes, and dependency changes can be tracked. A version of the build artifact may be in progress or have errors or licensing issues which prevents it from being deployed. For instance, a build artifact using open source code may have a license with a clause which prevents the build artifact from being deployed according to a company's internal policies, such as one that may require that any release of object code including the licensed open source software requires a free Intellectual Property (IP) license from the developer to use all of the code. An example of licenses with these clauses includes, but is not limited to, GNU General Public License (GPL) licenses and licenses with viral license terms. Viral license terms require that the license terms be carried forward in any software program which incorporates the open source code, which requires that the source code be made available upon request.

Through the enterprise service system, any developer or user (e.g., a manager, etc.) with access to the enterprise service system can access build artifacts, inspect the build artifacts, verify the compliance of the build artifacts, and/or prepare a build artifact for deployment. As such, a developer can implement quality control by inspecting or analyzing build artifacts to determine if the build artifacts are ready for deployment. The developer can generate or obtain one or more rules that can be applied to source code modules and/or metadata for the source code module in a build artifact to determine if the build artifact satisfies the rules for compliance or deployment. Further, a developer can inspect build artifacts and generate summaries of the source code modules in build artifacts or certificates that indicate the build artifacts are compliant with one or more rules or requirements. The developer can obtain a build artifact and inspect the build artifact to determine the source modules, licenses, and dependencies associated with the build artifact.

For example, Node.js projects may be obtained from source control to generate build artifacts that comprise deterministic build bundles (e.g., tarballs). These build artifacts can be stored, audited, and deployed. As such, changes in build artifacts from one release to another can be inspected and monitored, open source licenses can be audited, and version tracking and rollback management can be implemented. Build artifacts can be presented on multiple timelines, for example, build timelines and deployment timelines. A timeline represents a linear collection or evolution of build artifacts. A build timeline shows an evolution of build artifacts that are based from a development workflow. For example, a GIT bridge could define a build timeline view to show build artifacts that have been built and successfully bundled, but not necessarily deployed to any environment. A deployment timeline shows a collection of artifacts that have been deployed to an environment. Deployment timelines are based on particular environments (e.g., staging or production) and noise is filtered out by not showing artifacts that were built but not deployed. Build artifacts can be created and scheduled in the future to place on any timeline. Inspecting build artifacts, verifying the compliance of build artifacts, and/or building code for deployment using inspected and verified build artifacts allows developers to create and manage sophisticated business logic around the deployment artifact creation process. Decisions made while inspecting build artifacts, verifying the compliance of build artifacts, and/or building code for deployment may be recorded and tracked. For example, users, actions taken, fields changed, and timestamps may be recorded and tracked.

In various embodiments, users can employ dependency graph diffing to understand source code module drift or changes between build artifacts. A recursive procedure can be employed to trace dependencies down to a root level, allowing for a complete picture of any changes throughout the dependency structure. Examples of source code module changes, may include, but are not limited to source code modules added, source code modules removed, source code module version changes, and the like. Source code module changes can be provided (e.g., displayed) to the user.

Users can establish policy configurations and overrides. Establishing policies allows users to create policies (e.g., policy files) for analysis plugins. For example, policies may help to define important rules for a team. Policies can be established for each analysis plugin and may be applied to one or more projects on an artifact, module, plugin, and/or project level. Policies can be used to establish overrides, which may allow users to ignore rule violations. For example, certain licenses may be flagged as an error in one project and as a warning in another project. Overrides can be implemented at the global level, the project level, the project or source code module path level, and the source code module level.

Users can access a build artifact timeline. Implementing a build artifact timeline may comprise collecting predefined build artifact features and providing them to the user on a timeline. A build artifact timeline allows users to find and isolate build artifacts. The build artifact timeline may be filtered by labels, branches, status, time intervals, or any other suitable parameters.

Build pipelines can be established to allow cascading builds and actions in an upstream build may automatically trigger actions in downstream builds to provide visibility to other development teams. For example, when a source code module is built and passes all checks it will trigger a build in any source code modules or projects that directly depend on it.

Once the various build verification processes are complete, a report or other type of compliance check can be reviewed for a given project build. Any errors or other issues can be corrected, and a deployed version can be generated. The deployed version can include a certificate showing compliance with the development rules and policies (e.g., compliance with open source license requirements). The certificate can be a separate output or file and/or the certificate can be included in the metadata associated with the deployed version. When the certificate is included in the metadata, it may be transferred with the deployed version as it is distributed. In some embodiments, the certificate can include a digitally signed key to limit the opportunities for the deployed version to be modified or changed. For example, the certificate can be signed with a secure hash around the deployed code, and a later hash function can be used to indicate if any changes are made between the deployed version and the version at the time the hash function is performed. In some embodiments, an optional file can be created that demonstrates compliance with certain requirements. For example, an open source license compliance document can be created by the system and used during a transaction involving the deployed code (e.g., during license, sale, transfer, etc. of the deployed code).

All of these actions can be performed in an automated fashion using the computer system. The ability to establish the various systems, overrides, and tracking allows for modules to be compiled and deployed in an efficient manner across multiple projects. The resulting improvement to the system of generating and validating computer code can be used within an enterprise to verify compliance with development guidelines and/or policies across multiple projects. In essence, the system allows for the automated creation of the computer code while generating a compliance report to improve the tracking and compliance with code creation policies as well as providing an enhanced understanding of code changes across one or more projects. In some embodiments, the improved system allows for the application of the system across multiple enterprises. The use of the system can apply beneficial policies and procedures developed for one project to the next, thereby leveraging the benefits developed for a first code development project to one or more additional code development projects. The system may also be used retroactively to review an existing code product for compliance with rules and procedures, which may allow for identification of modifications needed in existing software projects. Use with existing code may also allow a compliance certificate or documentation to be prepared. For example, a compliance report for any open source licenses associated with the existing software can be created, which may be useful during commercial transactions involving the code.

Figure 1:
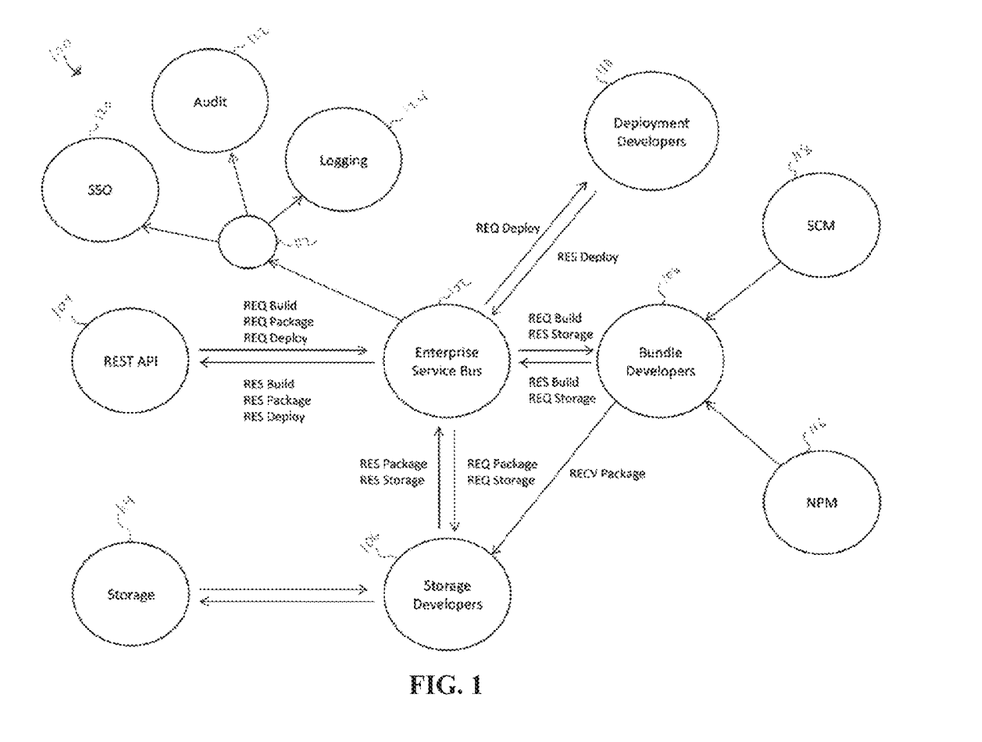
FIG. 1 is a schematic diagram of an embodiment of an enterprise service system.

FIG. 1 is a schematic diagram of an embodiment of an enterprise service system 100. Enterprise service system 100 comprises an enterprise service bus 102 that is in data communication with a plurality of application interfaces 104-112. Enterprise service bus 102 and application interfaces 104-112 may be configured as shown in FIG. 1 or in any other suitable manner. Enterprise service bus 102 may be configured to interface with any suitable interfaces as would be appreciated by one of ordinary skill in the art upon viewing this disclosure.

Enterprise service bus 102 is a software architecture that is configured to allow data communication between interacting software applications in a service oriented architecture (SOA). For example, application interface 104 is a Representation State Transfer (REST) Application Program Interface (API) that is configured to interface with a REST architecture that comprises a coordinated set of architectural constraints applied to components, connectors, and data elements within a distributed hyper media system. Enterprise service bus 102 and application interface 104 are configured to communicate request (REQ) messages and response (RES) messages with each other, such as, REQ/RES deploy messages, REQ/RES build messages, and REQ/RES package messages.

Application interface 106 is configured to interface with applications for storage developers. Application interface 106 is also configured to interface with storage 114 to store and retrieve data. For example, storage 114 may be configured to store and retrieve source code modules, metadata, build artifacts, and test rules. Storage 114 may be any suitable data storing device (e.g., a memory) as would be appreciated by one of ordinary skill in the art upon viewing this disclosure. Storages are described in more detail herein. Enterprise service bus 102 and application interface 106 are configured to communicate REQ messages and RES messages, such as, REQ/RES package messages and REQ/RES storage messages.

Application interface 108 is configured to interface with applications for bundler developers. Application interface 108 is also configured to interface with a node package manager (NPM) 116 and a source code manger (SCM) 118. In an embodiment, NPM 116 can be remote from other components of the enterprise service system 100. For example, NPM 116 may be located in a different geographical location than one or more components of enterprise service system 100. NPM 116 is a registry for open source node.js projects, JavaScript Object Notation (JSON) packages, open source modules, and resources. SCM 118 is configured to manage source code and to track source code revisions. Enterprise service bus 102 and application interface 108 are configured to communicate REQ messages and RES messages, such as, REQ/RES build messages and REQ/RES storage messages. Further, the application interface 108 is also configured to interact with the application interface 106. The application interface 108 and application interface 106 are configured to communicate received (RECV) messages, such as, RECV package messages.

Application interface 110 is configured to interface with applications for deployment developers. Enterprise service bus 102 and application interface 110 are configured to communicate REQ messages and RES messages, such as, REQ/RES deploy messages.

Application interface 112 is configured to interface with customer-supplied applications. Application interface 112 is configured to interface with a Single Sign-On (SSO) application 120, an audit application 122, and a logging application 124. For example, SSO application 120 is configured to allow users to access multiple systems and/or applications using a single log-in. Audit application 122 is configured to allow a user to audit a software project, source code, and/or open source modules. Logging application 124 is configured to track revisions and versions for a software project, source code, and/or open source modules. Enterprise service bus 102 and application interface 112 are configured to communicate messages (e.g., REQ messages, RES messages, and RECV messages) with each other.

Figure 2:
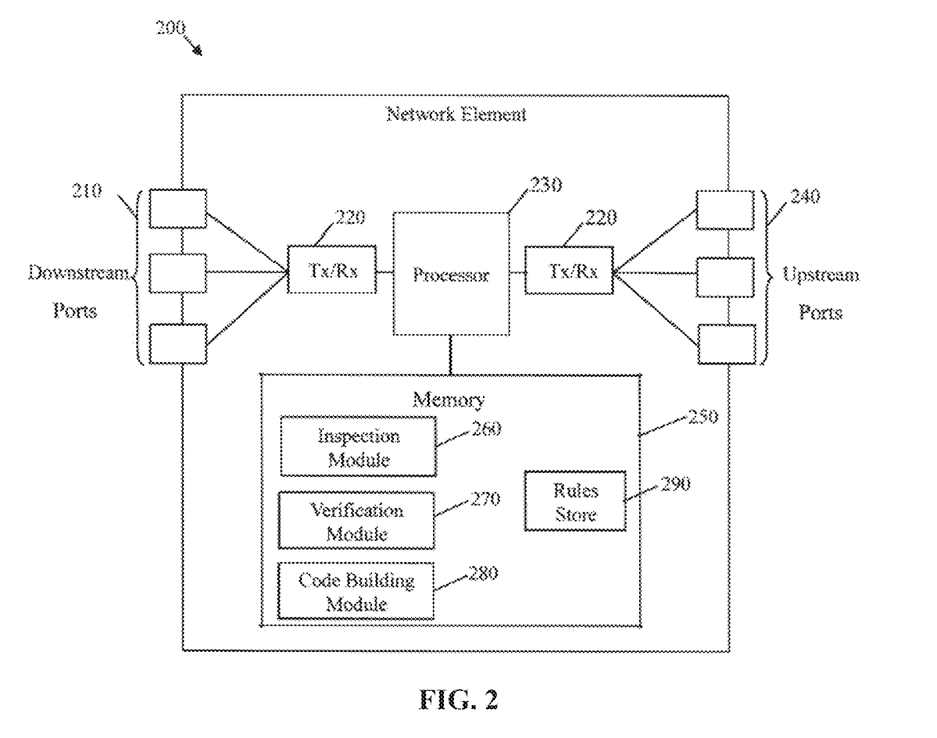
FIG. 2 is a schematic diagram of an embodiment of a network element used to inspect and verify source code modules in an enterprise service system.

FIG. 2 is a schematic diagram of an embodiment of a network element 200 used to inspect and verify build artifacts, open source code modules, and metadata within an enterprise service system, for example, enterprise service system 100 described in FIG. 1. Network element 200 is implemented in and/or integrated within a device that is implementing an enterprise service bus 102 and/or one or more application interfaces 104-112 described in FIG. 1. Further, the network element 200 may be a member of a distributed system that is configured to implement or to interface with an enterprise service system, such as enterprise service system 100. For example, a plurality of network elements 200 may be located at different geographic locations and all of the network elements 200 may be configured to implement, or to interface with, the enterprise service system. This allows multiple developers in different geographical locations to access and to work on a common project simultaneously.

At least some of the features/methods described in the disclosure are implemented in the network element 200. For instance, the features/methods of the disclosure may be implemented in hardware, firmware, and/or software installed to run on the hardware. The network element 200 may be any device (e.g., a computer, a tablet, a mobile device, a smart phone, a server, a client, etc.) that transports data through a network, system, and/or domain. Moreover, the terms network "element," "node," "component," "module," and/or similar terms may be interchangeably used to generally describe a network device and do not have a particular or special meaning unless otherwise stated and/or claimed within the disclosure. In one embodiment, the network element 200 is an apparatus configured to inspect build artifacts (e.g., source code modules and metadata), verify the compliance of build artifacts, and build code for deployable build artifacts by using inspected and verified build artifacts.

The network element 200 comprises one or more downstream ports 210 coupled to a transceiver (Tx/Rx) 220, which may be transmitters, receivers, or combinations thereof. The Tx/Rx 220 transmit and/or receive frames from other network nodes via the downstream ports 210. Similarly, the network element 200 comprises another Tx/Rx 220 coupled to a plurality of upstream ports 240, wherein the Tx/Rx 220 transmit and/or receive frames from other nodes via the upstream ports 240. The downstream ports 210 and/or the upstream ports 240 may include electrical and/or optical transmitting and/or receiving components.

A processor 230 may be coupled to the Tx/Rx 220 and may be configured to process the frames and/or determine which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to inspect build artifacts (e.g., source code modules and metadata), verify the compliance of build artifacts, and build code for deployable build artifacts by using inspected and verified build artifacts.

FIG. 2 illustrates that a memory module 250 is coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 is used to house the instructions for carrying out the various example embodiments described herein. In one example embodiment, the memory module 250 comprises an inspection module 260, a verification module 270, and a code building module 280 that can be implemented on the processor 230. In one embodiment, the inspection module 260 inspects source code modules and metadata for the source code modules for build artifacts. Verification module 270 is configured to inspect build artifacts (e.g., inspect licenses and dependencies) and to apply one or more compliance tests to source code modules and/or metadata for the source code modules. Code building module 280 is configured to prepare build artifacts for deployment. For example, code building module 280 is configured to apply one or more test rules to a source code module and/or metadata to generate a deployable source code module. In an embodiment, such may be done according to source code module inspection method 400 described in FIG. 4, source code module verification method 500 described in FIG. 5, and/or source code building method 600 described in FIG. 6. Inspection module 260, verification module 270, and code building module 280 can be implemented in a transmitter (Tx), a receiver (Rx), or both.

In an embodiment, memory module 250 comprises a rule store 290. Rule store 290 comprises one or more rules (e.g., policies, etc.) that can be applied to source code modules and/or to metadata for source code modules. Rules can be applied to source code modules and/or to metadata to determine whether a source code module satisfies a developer's requirements, for example, compliance requirements. Rules may comprise an approved list of licenses, an approved list of dependencies, an approved list of source code modules, an unapproved list of source code modules, an advisor list of source code modules that require further review, a list of bad license clauses, testing rules, and/or deployment rules.

It is understood that by programming and/or loading executable instructions onto the network element 200, at least one of the processors 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
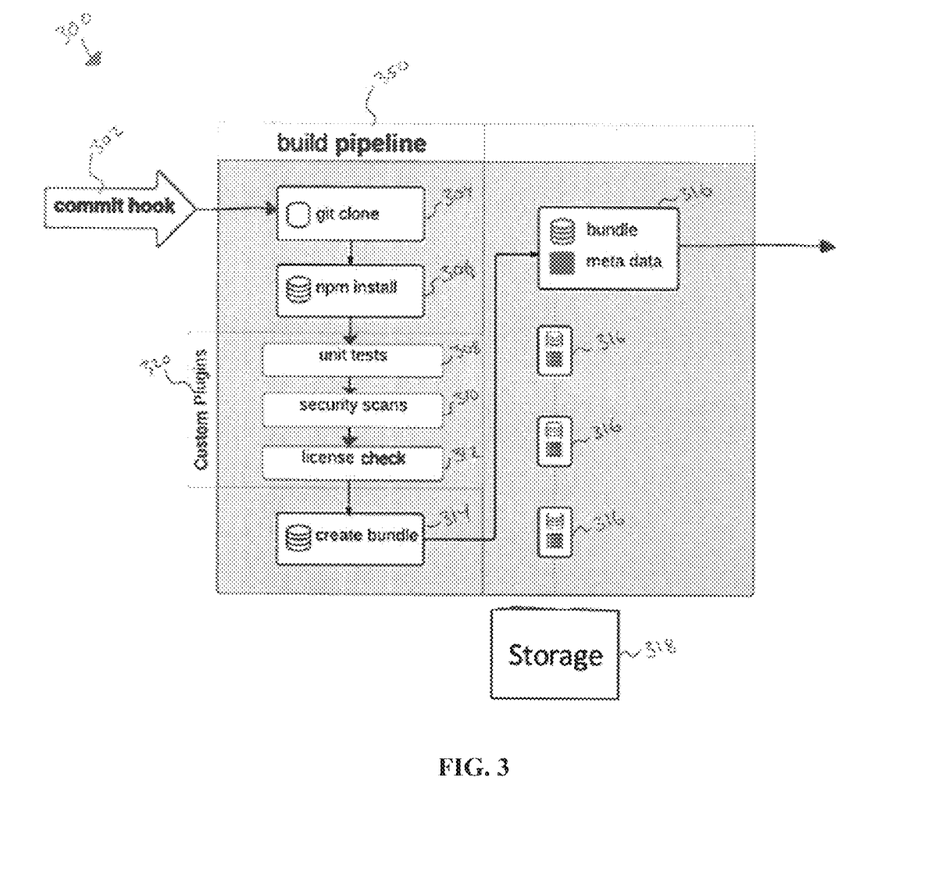
FIG. 3 is a schematic of an embodiment of a build process.

FIG. 3 is a schematic diagram of an embodiment of a build process 300 for a network device that is building artifacts. Build process 300 can be implemented by a network device (e.g., network element 200 described in FIG. 2) utilizing an enterprise service system (e.g., enterprise service system 100 described in FIG. 1). Build process 300 comprises a build pipeline 350. Build process 300 may be configured as shown or in any other suitable configuration as would be appreciated by one of ordinary skill in the art upon viewing this disclosure.

The network device initiates the build pipeline 350 by employing a commit hook 302 for a build artifact to access GIT clone 304. GIT clone 304 is configured to clone a repository. For example, GIT clone 304 clones a repository into a newly created directory, creates remote-tracking branches for each branch in the cloned repository, and creates and checks our an initial branch that is forked from the cloned repository's currently active branch. After cloning a repository, npm install 306 is configured to install source code modules, any other source code modules that it depends on, and metadata associated with the source code modules.

One or more analysis plugins 320 may be employed to perform analysis operations on the source code modules and/or metadata associated with the source code modules. Analysis plugins 320 may also be referred to as cartridges or cartridge APIs. Analysis plugins 320 may be configured globally (e.g., applied to all projects), on a project by project basis, and/or per artifact build. Analysis operations performed by the analysis plugins 320 can provide feedback on a source code module level, a file level, or a project level by flagging errors or warnings. Error and warning messages or flags may have a "call to action" for resolution. Errors prevent source code modules and build artifacts 316 from being "good" or "deployable." For example, the errors may be set by a flag that can be detected. In some embodiments, the errors do not interrupt the process (e.g., pause the pipeline flow or cause the analysis to exit the pipeline), but only set an error state for later consideration. Error and warning messages or flags can be set at the source code module level, the build artifact level, the file level, and the project level. Analysis plugins 320 can be configured to generate a log file and to provide log file data.

Figure 4:
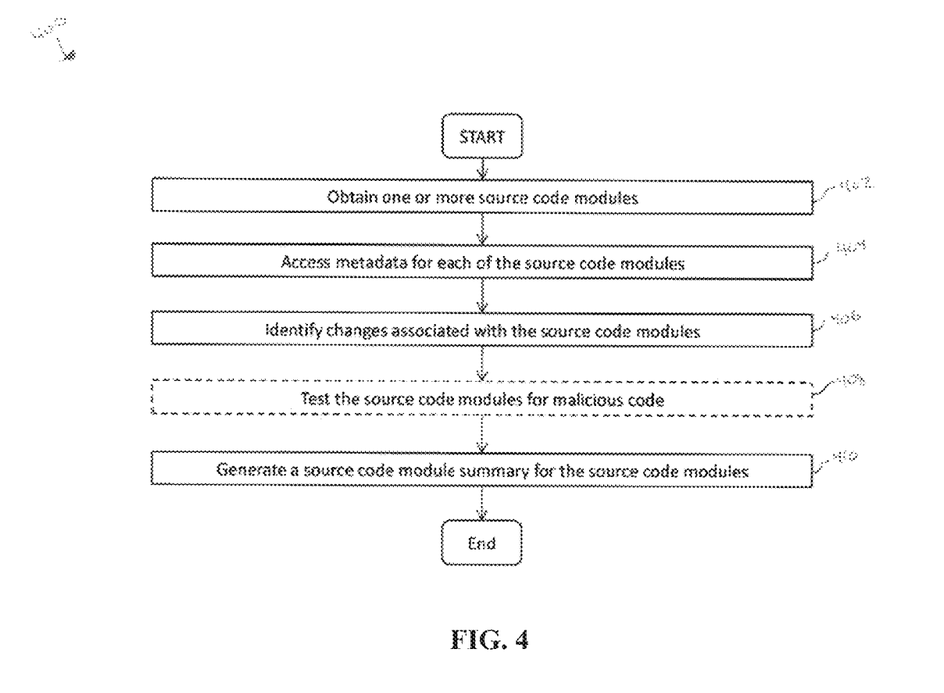
FIG. 4 is a flowchart of an embodiment of a source code module inspection method.
Figure 5:
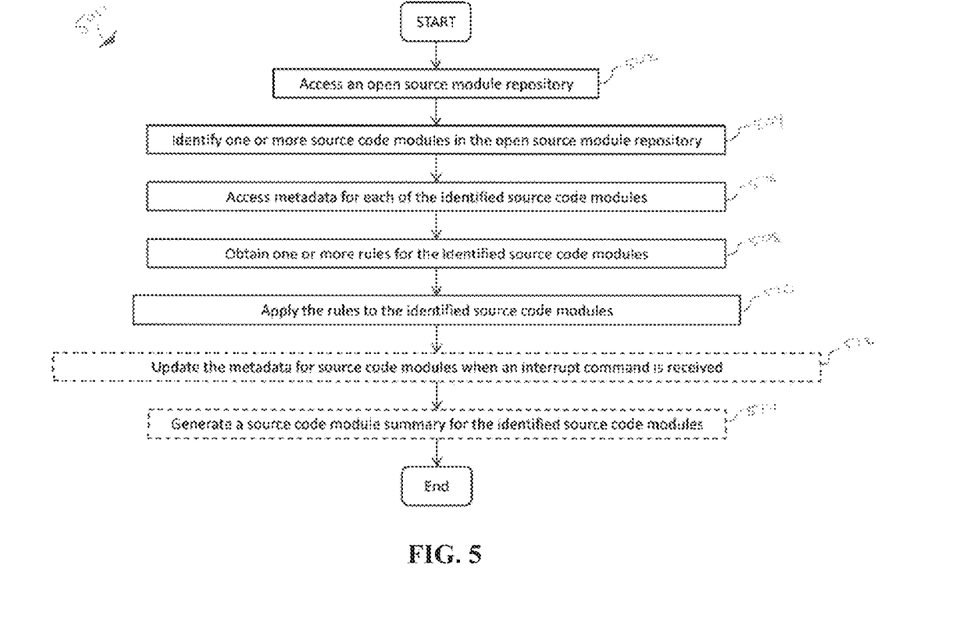
FIG. 5 is a flowchart of an embodiment of a source code module verification method.
Figure 6:
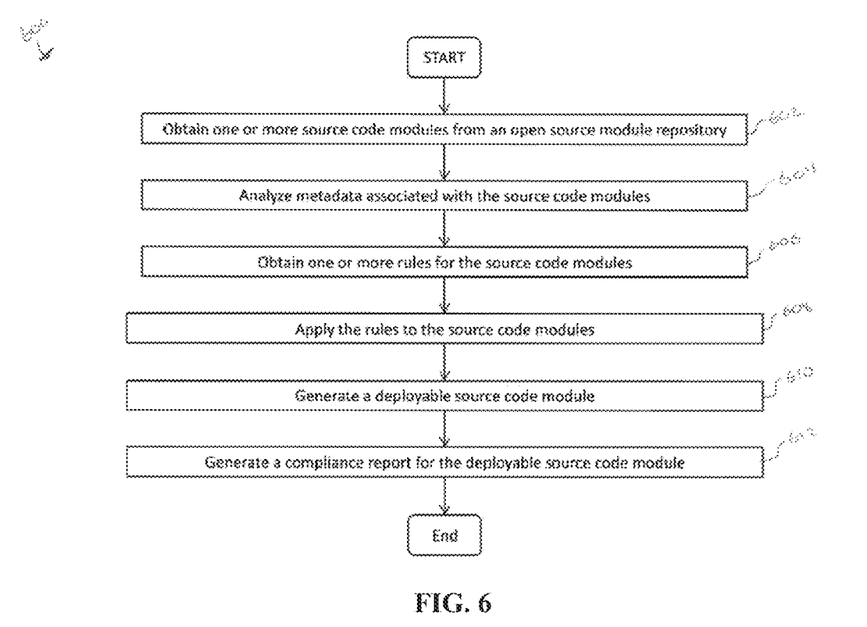
FIG. 6 is a flowchart of an embodiment of a source code building method.

Analysis operations may comprise source code module inspection (e.g., source code module inspection method 400 described in FIG. 4), source code module verification (e.g., source code module verification method 500 described in FIG. 5), and source code building (e.g., source code building method 600 described in FIG. 6). As an example, analysis plugin 320 comprises a unit test plugin 308, a security scan plugin 310, and a license check plugin 312. Alternatively, build pipeline 350 may comprise any other suitable configuration of analysis plugins 320. Unit test plugin 308 is configured to receive the source code modules and metadata, to test the functionality of each of the source code modules and the metadata, and to send the source code modules and metadata to security scan plugin 310. Security scan plugin 310 scans the source modules and metadata for malicious code, flags any source code modules and metadata that contain malicious code, and sends the source code modules and metadata to license check plugin 312. License check plugin 312 is configured to analyze licenses and dependency licenses for the source code modules. Further, license check plugin 312 is configured to test the source code modules and the metadata for license and dependency license compliance and to flag source code modules or metadata to indicate whether the source code modules and metadata are compliant.

Policies can be configured to override an error created by the plug-ins. The policies can be stored in a memory and retrieved during the analysis operation. A policy can include an identification of one or more plug-ins or analysis modules to which it applies, an identification of one or more projects, modules, and/or artifacts to which it applies, and various conditions that can be applied by the policy. The policies may set allowable conditions, unallowable conditions, conditional errors, and the like. For example, a policy may indicate when a GPL license is acceptable on a module-by-module basis. In this example, a license check plugin 312 may be configured with a policy that flags source code modules in a first project that comprise a GPL license as an error. The policy may then allow a source code module in a second project that comprises a GPL license to pass without an error. The policy would then include the identification of the relevant modules as well as the specific license types that are acceptable/unacceptable for each module.

The ability to use one or more plug-ins may allow the build pipeline to be extensible and customizable for specific needs. Different users can remove the default plugins and add custom plugins. The order of the plugins may not matter in some instances. In some embodiments, the plugins can be ordered so that an error or flag set by a first plugin may trigger a specific action in a downstream plugin. When combined with one or more policies from a policy store, the ability to customize and automate the overall build pipeline may represent an advantage over other systems.

After analyzing the source code modules and metadata with one or mode analysis plugins 320, the source code modules and metadata are sent to create bundle 314. Create bundle 314 is configured to receive the source code modules and metadata and to bundle the source code modules into a bundle. Create bundle 314 is also configured to create a build artifact 316 by joining the metadata associated with the source code modules within the bundle. A user can sign source code modules in a build artifact 316 to secure source code modules and to indicate that source code modules have not been tampered with since the time of signing. For example, a user can upload certificates to be used to sign source code modules. Signed source code modules and metadata associated with the source code module signatures are stored in build artifact 316. Metadata associated with source code module signatures may comprise algorithms used, information about certificates used to sign source code modules, and the amount of time spent during source code module signing. Build pipeline 350 is configured to store and retrieve build artifacts 316 from storage 318. The location of storage 318 or where data is stored in storage 318 is configurable. For example, storage 318 is a build artifact repository. The developer may further process the build artifact 316 for deployment after verifying that build artifacts 316 satisfy one or more rules for deployment.

FIG. 4 is a flowchart of an embodiment of a source code module inspection method 400 for a network device to inspect source code modules and metadata for the source code modules for build artifacts, which may be similar to instructions stored in inspection module 260 described in FIG. 2. Source code module inspection method 400 may be employed one or more times (e.g., recursively) by a developer to inspect source code module and metadata for a build artifact. In an embodiment, a developer (e.g., using enterprise service bus 102 described in FIG. 1) employs source code module inspection method 400 to identify source code modules for a build artifact, to access metadata information for the identified source code modules, to identify changes associated with the source code modules, and to generate a source code module summary for the identified source code modules. In another embodiment, source code module inspection method 400 may be implemented autonomously by the network device.

In an embodiment, the network device obtains a build list that comprises a list of one or more source code modules. At step 402, the network device obtains the one or more source code modules and metadata associated with the source code modules. For example, source code modules may be obtained from an open source code module repository on a remote server. An open source module repository may include, but is not limited to, a public npm repository, an on-premise npm repository, a private repository, and a GIT repository. At step 404, the network device accesses metadata for each of the source code modules. The accessed metadata may include, but is not limited to, viewable source code, commit history and authors, contributors, comments, tags, license information, license types, and dependency information. At step 406, the network device identifies changes associated with the source code modules. Changes associated with the source code modules may include, but are not limited to, line-by-line changes, dependency version changes, dependency additions, dependency deletions, and version changes. Optionally at step 408, the network device tests the source code modules for malicious code. Examples of malicious code may include, but is not limited to, virus type code, slow code, backdoor code, and buggy code. The network device may perform a spyware or malware scan on the source code modules to detect any malicious code. An error message or flag may be generated when malicious code is detected. At step 410, the network device generates a source code module summary for the source code modules that identifies the source code modules and presents at least a portion of the metadata and/or changes associated with the source code modules. The source code module summary representation may include, but is not limited to, an error message, a certificate, and text display on a graphical user interface (GUI). The source code module summary may be separate or included in the metadata for the source code modules and/or the build artifact. For example, the network device may generate a text display on GUI that identifies the source code modules and presents at least a portion of the metadata and/or changes associated with the source code modules. Alternatively, the network device may generate a certificate (e.g., a text document) that identifies the source code modules and presents at least a portion of the metadata and/or changes associated with the source code modules.

FIG. 5 is a flowchart of an embodiment of a source code module verification method 500 for a network device to inspect build artifacts and to apply one or more compliance tests to source code modules and/or metadata for the source code modules, which may be similar to instructions stored in verification module 270 described in FIG. 2. Source code module verification method 500 may be employed by a developer to verify the compliance of source code modules for a build artifact by inspecting source code modules and/or metadata and applying one or more compliance tests to the source code modules and/or metadata in the build artifact. In an embodiment, a developer (e.g., using enterprise service bus 102 described in FIG. 1) employs source code module verification method 500 to identify source code modules, to access metadata information for the identified source code modules, to obtain test rules for the identified source code modules, and to apply the test rules to the source code modules. In another embodiment, source code module verification method 500 may be implemented autonomously by the network device.

In an embodiment, the network device obtains a build list that comprises a list of one or more source code modules. At step 502, the network device accesses an open source module repository. For example, the network device may access a public npm repository on a remote server. At step 504, the network device identifies the one or more source code modules in the open source module repository and metadata associated with the source code modules. The network device may identify source code modules in the open source module repository using dependency information and/or license dependencies from the metadata of a build artifact. At step 506, the network device accesses metadata for each of the identified source code modules. The accessed metadata may include, but is not limited to, viewable source code, commit history and authors, contributors, comments, tags, license information, license types, and dependency information.

At step 508, the network device obtains one or more rules (e.g., policies, etc.) for the identified source code modules. For examples, rules may be generated by a developer or obtained from a rules database. As described herein, the rules or policies can be developed by a user and included in the processing, which may allow the platform to be expanded for a desired function. In an embodiment, rules may comprise an approved list of source code modules, an unapproved list of source code modules, a list of source code modules that require further review, a list of approved licenses, and/or a list of bad license clauses. In some embodiments, the rules or policies can be established for each analysis plugin and may be applied to one or more projects on an artifact, module, plugin, and/or project level. Policies can be used to establish overrides, which may allow users to ignore rule violations. At step 510, the network device applies the rules to the identified source code modules and/or metadata for the source code modules to determine if the identified source code modules satisfy the rules. In an embodiment, the rules may be applied to the source code modules to identify approved source code modules and/or unapproved source code modules. In another embodiment, the rules may be used to parse the licenses of the source code modules to identify approved source code modules that are not associated with licenses having bad clauses. An error message or flag may be generated when unapproved source code modules or licenses with bad clauses are detected.

Optionally at step 512, the network device updates the metadata information for source code modules when an override command is received or detected. When applying rules to the source code modules is omitted or interrupted (e.g., by a developer), the metadata for the source code modules may be updated to indicate an override command was received. For example, the metadata be updated with an override flag, a reason for the override, and/or an identifier for the user that executed the override command. In some embodiments, overrides can be implemented at the global level, the project level, the project or source code module path level, and the source code module level. Optionally at step 514, the network device generates a source code module summary for the identified source code modules. The source code module summary may include, but is not limited to, an error message, a certificate, and text display on a GUI. The source code module summary may be separate or included in the metadata for the source code modules and/or the build artifact. For example, the network device may generate a text display on a GUI that identifies approved source code modules and/or unapproved source code modules from the identified source code modules. Alternatively, the network device may generate a certificate (e.g., a text document) that identifies approved source code modules and/or unapproved source code modules from the identified source code modules. Further, the certificate indicates compliance with the rules.

FIG. 6 is a flowchart of an embodiment of a source code building method 600 for a network device to prepare build artifacts for deployment, which may be similar to instructions stored in code building module 280 described in FIG. 2. Source code building method 600 may be employed by a developer to apply one or more test rules to a source code module and/or metadata generate a deployable source code module. In an embodiment, a developer (e.g., using enterprise service bus 102 described in FIG. 1) employs source code building method 600 to obtain one or more source code modules, to analyze metadata associated with the source code modules, to obtain one or more rules for the source code modules, to apply the rules to the source code modules, and to generate a deployable source code module. In another embodiment, source code building method 600 may be implemented autonomously by the network device.

In an embodiment, the network device obtains a build list that comprises a list of one or more source code modules. At step 602, the network device obtains the one or more source code modules and metadata associated with the source code modules from an open source module repository. For example, the network device may access a public npm repository on a remote server. In an embodiment, source code modules may be obtained at build time with their associated metadata. The source code modules and their associated metadata may be compiled to generate a build artifact. At step 604, the network device analyzes metadata associated with the source code modules in the build artifact. Analyzing metadata associated with the source code modules may include, but is not limited to, checking dates (e.g., last modified dates) associated the source code module and/or checking version numbers and/or license types associated with the source code modules. For example, version numbers may be checked to ensure that the dependent source code modules are available and properly incorporated. At step 606, the network device obtains one or more rules for the source code modules. For examples, rules may be generated by a developer or obtained from a rules database (e.g., on a remote server or rule store 290 described in FIG. 2). In an embodiment, rules may comprise an approved list of licenses, an approved list of dependencies, an approved list of source code modules, an unapproved list of source code modules, an advisor list of source code modules that require further review, a list of bad license clauses, testing rules, and/or deployment rules. At step 608, the network device applies the rules to the source code modules and/or metadata to determine if the source code modules satisfy the rules. Rules may be applied to the source code modules similarly to step 510 described in FIG. 5. When a license type or dependency violates a rule, another source code module or another version of the source code module can be substituted. For instance, the source code module versions can be checked and an earlier version of the source code modules with a different license or dependency can be used. At step 610, the network device generates a deployable build artifact when a source code is approved by the application of the one or more rules, for example, the source code module is compliant and the rules are satisfied. At step 612, the network device generates a compliance report for the deployable build artifact. Compliance report representations may include, but are not limited to, an error message, a certificate, and text display on a GUI. The compliance report may be separate or included in the metadata for the source code modules and/or the deployable build artifact. For example, the network device may generate a text display on a GUI that identifies the approved source code modules.

In some embodiments, the network device may generate or obtain a certificate (e.g., a text document) that identifies approved source code modules. A certificate may comprise a digitally signed key that indicates the build artifact or source code modules within the build artifact have not changed from build to deployment. For example, a digital certificate can be generated for the code, an artifact, and/or metadata indicating various characteristics. The digital certificate can be stored within the system and/or provided with the source code module. The certificate can be encrypted, contain a hash key, or the like that can be used to verify the authenticity of the certificate. In turn, the certificate and its information can be used to verify the authenticity of the code, artifact, and/or metadata. The certificate can include information including the algorithm used to create the certificate, the information about the certificate used to sign, the amount of time spent during the signing, a certificate creation date, and/or a date and/or version number associated with the code, artifact, and/or metadata being signed.

Optionally, the network device generates a compliance document to comply with license terms of the source code modules. For instance, the compliance document may include, but is not limited to, attribution as is appropriate, required copyright notices, and required license terms. Optionally steps 606-612 can be repeated using different rule sets, for example, as a due diligence option. For example, one or more of the steps 606-612 can be repeated with existing software in order to create a compliance document for existing software or code. In this way, the process may be useful for assessing compliance within an enterprise or across multiple enterprises for existing code bases.

Figure 7:
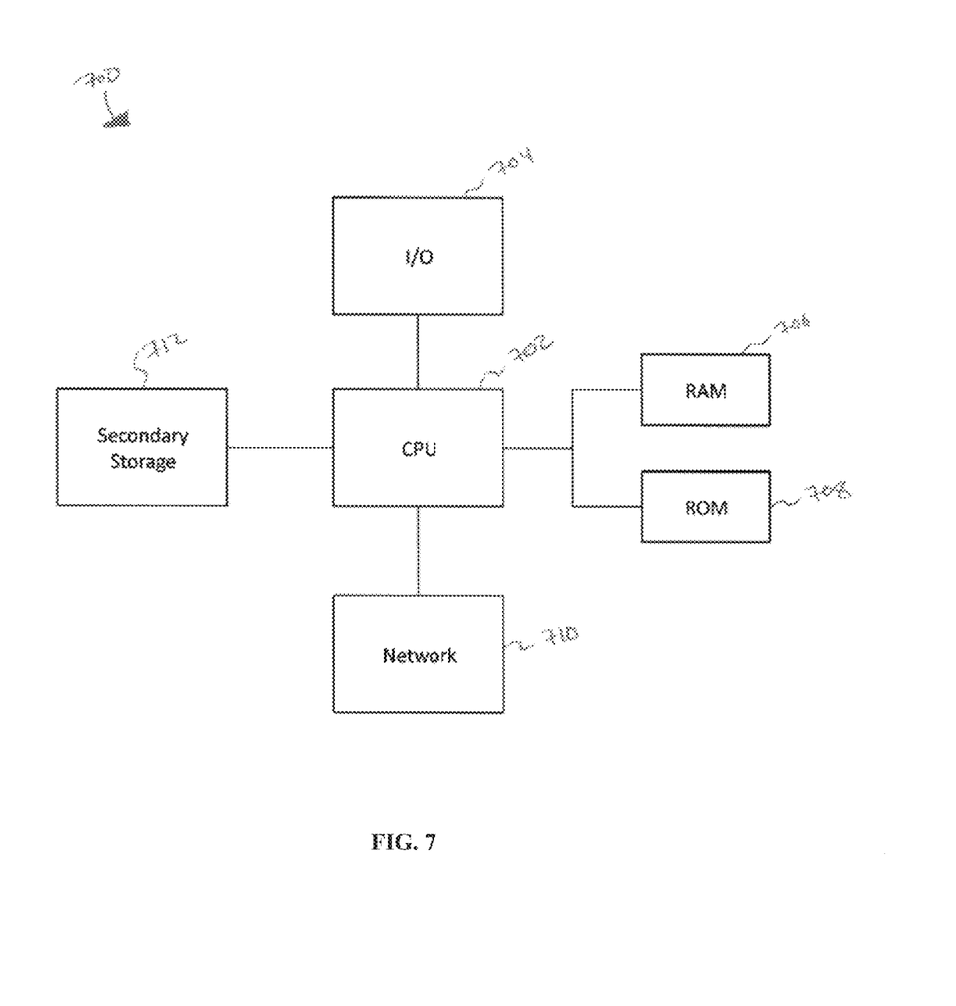
FIG. 7 is a schematic of an embodiment of a computer system used to inspect and verify source code modules in an enterprise service system.

FIG. 7 is a schematic of an embodiment of a computer system 700 used to inspect and verify source code modules in an enterprise service system. The computer system 700 includes a processor 702 (which may be referred to as a central processor unit or CPU) that is in communication with memory devices including secondary storage 712, ROM 708, RAM 706, input/output (I/O) devices 704, and network connectivity devices 710. The processor 702 may be implemented as one or more CPU chips.

It is understood that by programming and/or loading executable instructions onto the computer system 700, at least one of the CPU 702, the RAM 706, and the ROM 708 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 712 is typically comprised of one or more disk drives or tape drives and is used for non-volatile storage of data and as an over-flow data storage device if RAM 706 is not large enough to hold all working data. Secondary storage 712 may be used to store programs which are loaded into RAM 706 when such programs are selected for execution. The ROM 708 is used to store instructions and perhaps data which are read during program execution. ROM 708 is a non-volatile memory device which typically has a small memory capacity relative to the larger memory capacity of secondary storage 712. The RAM 706 is used to store volatile data and perhaps to store instructions. Access to both ROM 708 and RAM 706 is typically faster than to secondary storage 712. The secondary storage 712, the RAM 706, and/or the ROM 708 may be referred to in some contexts as computer readable storage media and/or non-transitory computer readable media.

I/O devices 704 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 710 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. In an embodiment, network connectivity 710 may be incorporated with or configured to interface with a network element similar to network element 200 described in FIG. 2. These network connectivity devices 710 may enable the processor 702 to communicate with an Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave generated by the network connectivity devices 710 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 712), ROM 708, RAM 706, or the network connectivity devices 710.

While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 712, for example, hard drives, floppy disks, optical disks, and/or other device, the ROM 708, and/or the RAM 706 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer-usable program code embodied therein to implement the functionality disclosed above. For example, program may include, but is not limited to, instructions for implementing source code module inspection method 400 described in FIG. 4, source code module verification method 500 described in FIG. 5, and/or source code building method 600 described in FIG. 6. The computer program product may comprise data structures, executable instructions, and other computer-usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, CD-ROM disks, floppy disks, jump drives, digital cards, multimedia cards, and others. The computer program product may be suitable for loading, by the computer system 700, at least portions of the contents of the computer program product to the secondary storage 712, to the ROM 708, to the RAM 706, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 710. The computer program product may comprise instructions that promote the loading and/or copying of data, data structures, files, and/or executable instructions to the secondary storage 712, to the ROM 708, to the RAM 706, and/or to other non-volatile memory and volatile memory of the computer system 700.

In some contexts, a baseband signal and/or a signal embodied in a carrier wave may be referred to as a transitory signal. In some contexts, the secondary storage 712, the ROM 708, and the RAM 706 may be referred to as a non-transitory computer readable medium or a computer readable storage media. A dynamic RAM embodiment of the RAM 706, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. An open source code module inspection method comprising:
   generating, by a computer, a build list, wherein the build list comprises a list of one or more open source code modules;

obtaining, by the computer from a remote server, the one or more open source code modules and metadata associated with the one or more open source code modules;

accessing, by the computer, at least a portion of the metadata for each of the one or more open source code modules;

identifying, by the computer, a license associated with each of the one or more open source code modules based on the build list;

generating, by the computer, an open source code module summary for the one or more open source code modules, wherein the open source code module summary identifies the one or more open source code modules, licenses associated with the one or more open source code modules, and comprises the portion of the metadata for each of the one or more open source code modules;

scanning the one or more open source code modules for malicious code;

generating an error message when malicious code is detected;

compiling, by the computer, the one or more open source code modules and metadata associated with the one or more source code modules to create a build artifact;

applying, by the computer prior to generating a deployable build artifact, one or more rules to the one or more source code modules and the open source code module summary to determine whether the one or more source code modules satisfy the one or more rules; and generating, by the computer, the deployable build artifact from the build artifact in response to the one or more source code modules satisfying all of the one or more rules.

2. The method of claim 1, wherein the open source code module summary indicates changes associated with the one or more open source code modules from a base version of the one or more open source code modules.

3. The method of claim 1, wherein the portion of the metadata comprises licenses associated with each of the one or more open source code modules.

4. The method of claim 1, wherein the portion of the metadata identifies a contributor for one of the one or more open source code modules.

5. The method of claim 1, wherein the portion of the metadata comprises dependency information for the one or more open source code modules.

6. The method of claim 1, further comprising identifying dependency changes associated with the one or more open source code modules.

7. A source code verification method comprising:
obtaining, by a computer, a build list, wherein the build list comprises a list of one or more source code modules;

identifying, by the computer, the one or more source code modules in an open source module repository and metadata associated with the one or more source code modules;

accessing, by the computer, at least a portion of the metadata for each of the one or more source code modules;

obtaining, by the computer, one or more rules for the one or more source code modules;

applying, by the computer, the rules to each of the one or more source code modules to determine whether the one or more source code modules satisfy the rules; and detecting an override command, wherein the override command indicates to omit applying one or more of the rules;

updating the metadata associated with the one or more source code modules to indicate that the override command was detected;

generating a source code module summary for the one or more source code modules, wherein the source code module summary identifies the one or more source code modules and comprises the portion of the metadata for each of the one or more source code modules;

generating, by the computer, a deployable build artifact comprising one or more source code modules when the one or more source code modules satisfying the one or more rules.

8. The method of claim 7, wherein the portion of the metadata comprises licenses associated with each of the one or more source code modules.

9. The method of claim 7, wherein the portion of the metadata comprises dependency information for the one or more source code modules.

10. The method of claim 7, wherein the rules identify approved source code modules.

11. The method of claim 7, wherein the rules identify prohibited license clauses, and wherein applying the rules parses licenses associated with each of the one or more source code modules to determine whether the one or more source code modules comprise prohibited license clauses.

12. The method of claim 7, further comprising generating an error message in response to determining that one or more of the one or more source code modules do not satisfy the rules.

13. A source code building method comprising:
generating, by a computer, a build list, wherein the build list comprises a list of one or more source code modules;

obtaining, by the computer, the one or more source code modules and metadata associated with the one or more source code modules from an open source module repository;

compiling, by the computer, the one or more source code modules and metadata associated with the one or more source code modules to create a build artifact;

analyzing, by the computer, at least a portion of the metadata for each of the one or more source code modules;

obtaining, by the computer, one or more rules for the one or more source code modules, wherein the one or more rules comprise a version check rule for the one or more source code modules;

applying, by the computer, the rules to the one or more source code modules to determine whether the one or more source code modules satisfy the rules;

generating, by the computer, a deployable build artifact when the one or more source code modules satisfy the one or more rules; and generating, by the computer, a compliance report for the deployable build artifact, wherein the compliance report identifies the one or more source code modules in the deployable build artifact.

14. The method of claim 13, further comprising:
identifying a substitute source code module from the one or more source code modules when one or more of the rules are not satisfied; and presenting the substitute source code module as a substitution option.

15. The method of claim 13, wherein the rules identify approved source code modules.

16. The method of claim 13, wherein the rules identify prohibited license terms.

17. The method of claim 13, further comprising: generating a certificate that comprises a digitally signed key for the deployable build artifact or metadata associated with the certificate.

18. The method of claim 17, wherein the certificate comprises data including at least one of an algorithm used to generate the certificate, an identification of a portion of the deployable build artifact or the metadata used to generate the certificate, or an amount of time spent generating the certificate.

19. The method of claim 17, further comprising, deploying the deployable build artifact as a deployed code.

* * * * *